3,314,939
PHOTOINITIATING COMPOUNDS PREPARED BY ESTERIFYING CELLULOSIC MATERIAL WITH SUBSTITUTED ANTHRAQUINONES
Norman Thomas Notley, London, England, assignor to E. I. du Pont de Nemours and Company, Wilmington, Del., a corporation of Delaware
No Drawing. Filed July 6, 1962, Ser. No. 208,090
9 Claims. (Cl. 260—214)

This invention relates to new chemical compounds and more particularly to polymeric compounds that have photoinitiating properties. It also relates to processes for preparing such compounds.

Various photoinitiators for the addition polymerization of ethylenically unsaturated compounds are known. The best known photoinitiators include organic peroxides, acyloins and vicinal ketaldonyl compounds. More recently, monomeric polynuclear quinones have become of importance in the addition polymerization of acrylic and methacrylic acid esters of monohydric and polyhydric alcohols and related compounds because the photopolymerization takes place at a faster rate. In addition, the monomeric polynuclear quinones are thermally inactive at temperatures below 185° C. and according to Notley U.S. Patent 2,951,758 issued Sept. 6, 1960, are very useful in making photopolymerizable compositions and elements for the preparation of printing plates.

While monomeric polynuclear quinones are good photoinitiators, their usefulness is sometimes limited. For example, anthraquinone has only a limited solubility in certain monomeric compounds. In making a photopolymerizable plate using such a monomer, an excess of anthraquinone crystallizes after a few hours, giving a plate defect known as "white specks." The amount of anthraquinone in such systems must, therefore, be kept below the solubility maximum. This, in turn, may affect the photospeed of the polymerizable system which, up to a certain point, is proportional to the initiator concentration.

An object of this invention is to provide a process for preparing a new class of chemical compounds having photoinitiating properties. Another object is to provide such a process whereby new photoinitiators can be prepared in a practical manner from available chemical compounds. A further object is to prepare polymeric compounds which, when activated by actinic light, initiate addition polymerization reactions. Still further objects will be apparent from the following description of the invention.

The novel compounds of this invention are polymeric, polynuclear quinones having a plurality of recurring polymer units to which there is joined through a linkage selected from the group consisting of amide, ester, ether and urethane linkages a polynuclear quinone radical and preferably an anthraquinone radical. The polymer may be a hydroxyl-containing polymer including a carbohydrate.

The new polymeric polynuclear quinones in general can be prepared in accordance with the invention by reacting a linear cellulosic polymer with a suitable derivative of a polynuclear quinone so that the quinone is bound to the polymer molecule by means of a carbon-oxygen or carbon-nitrogen linkage. Thus, it is possible to first make the cellulose ester and then combine it with the polynuclear quinone, or, alternatively, first make a suitable quinone derivative which is then reacted with a hydroxyl group of the cellulose or the cellulose ester to make the corresponding high molecular weight quinone compound. When two or more quinone derivatives are used, mixed polymers are formed.

In an important specific aspect of the invention, the polymeric polynuclear quinones are cellulose partial ethers and esters having linked thereto through an ester linkage a polynuclear quinone. These novel polymeric polynuclear quinone compounds can be made, in accordance with the invention, by reacting a polynuclear quinone containing an acid halide group, e.g., a carboxylic acid or sulfonic acid halide group with a cellulose partial ether or ester, i.e., one containing at least one free and esterifiable hydroxy group per glucose unit. Among the useful cellulose derivative reactants are cellulose esters of fatty acids of 2 to 4 carbon atoms, including cellulose acetate, propionate, butyrate, phthalate, maleate, succinate, glutarate, acetate-phthalate, acetate-succinate, propionate-maleate, acetate butyrate, etc.; cellulose alkyl and aryl ethers containing 1 to 7 carbon atoms in the lateral group, e.g., methyl cellulose, ethyl cellulose and benzyl cellulose.

The polynuclear quinone reactants containing a carboxylic acid chloride or sulfonic acid chloride group have two intracyclic carbonyl groups in a conjugated ring, there being at least one aromatic carboxylic ring fused to the ring containing the carbonyl groups.

Suitable polynuclear quinone reactants containing acid halide groups include anthraquinone-1-carboxylic acid chloride, anthraquinone-2-carboxylic acid chloride, anthraquinone-2-sulfonic acid chloride, 1-nitroanthraquinone-4-sulfonic acid chloride, 1,4-dichloroanthraquinone-2-sulfonic acid chloride, 1-nitroanthraquinone-8-sulfonic acid chloride and phenanthrenequinone-3-carboxylic acid. The acid chlorides can be made from the corresponding free acids.

According to a further important aspect of the invention, polymeric polynuclear quinones having the quinone nucleus linked to a cellulose derivative through an amide linkage can be made, in accordance with another aspect of the invention, by an acylation (imide forming) reaction of a polynuclear quinone containing an amino group (—NH$_2$) and a cellulose ester of a dicarboxylic acid or a cellulose ether of a hydroxycarboxylic acid containing a free —COOH group. Among the useful aminopolynuclear quinone reactants are 1-aminoanthraquinone and 2-aminoanthraquinone.

Suitable cellulose esters or ethers containing free carboxylic acid groups include cellulose acetate hydrogen succinate, maleate, glutarate and phthalate and carboxymethylcellulose. These cellulose esters and ethers may be mixed derivatives and may have some original hydroxyl groups esterified with acetate, propionate or butyrate groups or etherified and contain methoxy, ethoxy or benzyloxy groups.

The novel polymeric polynuclear quinones of the invention are essentially non-migratory or fast to diffusion in thin layers. They have properties of organic protective colloids and do not crystallize out of thin layers where they are admixed with other colloid binding agents. The polymeric polynuclear quinones are particularly useful in photopolymerizable systems comprising two or more photopolymerizable layers or strata wherein the concentration of the photoinitiator in said layers or strata varies. These photoinitiators cannot migrate and diffuse from one layer into an adjacent layer, so that the desired characteristics of elements having an initiator differential in a plurality of photopolymerizable strata are insured. Likewise, in elements having an initiator-free auxiliary layer adjacent to a photopolymerizable layer, the auxiliary layer cannot become contaminated as a consequence of unwanted initiator migration.

The polynuclear quinone nucleus being chemically bound to a polymer molecule prevents crystallization of an exess of initiator. Therefore, the photospeed can be increased by adding higher amounts of initiator without

EXAMPLE I

A high molecular weight derivative of anthraquinone was made by adding at room temperature 0.05 g. of 2-aminoanthraquinone dissolved in a minimum quantity of acetone to 200 g. of cellulose acetate hydrogen succinate dissolved in a mixture of 1300 ml. of acetone and 130 ml. of ethanol. The cellulose ester used had a degree of acetyl substitution of 1.9, of succinyl substitution of 0.7 and can be prepared from cellulose acetate and succinic anhydride and an esterification catalyst, e.g., potassium acetate or diethylcyclohexylamine. The mixture, which was a homogeneous solution, was kept at room temperature over night and then poured into 1000 ml. of water. The polymeric amide precipitated, was collected on a filter and dried. The polymeric polynuclear quinone when substituted for the monomeric polynuclear quinones in the photopolymerizable compositions of the type in the examples of Notley U.S. Patent 2,951,758 gives improved results.

For example, a photopolymerizable composition was prepared by mixing on a rubber mill at 120° C. for 15 minutes a mixture of 33 g. of triethylene glycol diacrylate and 67 g. of the polymeric amide of 2-aminoanthraquinone as a photoinitiator. The photopolymerizable composition was formed into a sheet having a thickness of 20 mils, placed on an aluminum sheet support coated with a layer of adhesive according to assignee's U.S. patent application Ser. No. 750,868 filed July 25, 1958, U.S. Patent No. 3,036,913, May 29, 1962, and the element formed was placed in a hydraulic press, the platens of which had been preheated to 150° C. and pressed for 3 minutes at 200 p.s.i. Test step exposures were made by exposing the photopolymerizable composition to actinic radiation from an 1800-watt high pressure mercury arc light through a process negative having isolated dots as well as halftone patterns. The photopolymer plate segments were exposed to 1.75 watts of actinic radiation per square inch for 2 to 8 seconds in 1 second increments. The unexposed material was washed out with a 0.04 N aqueous solution of sodium hydroxide. Twenty-mil dots were present in the segments exposed for 2 seconds or more and the halftone pattern could be seen in the segments exposed for 4 seconds or more.

A control element was prepared in the manner described above except that the photoinitiator was omitted from the photopolymerizable composition. Upon exposure to 1.75 watts of actinic radiation per square inch for more than 8 seconds and subsequent washout, neither the isolated dots or the halftone features of the process negative were present.

EXAMPLE II

A polymeric derivative of anthraquinone was prepared by reacting 100 g. of cellulose acetate succinate with 0.5 g. of 2-aminoanthraquinone by the procedure described in Example I. To the high molecular weight polyamide was added 50 g. of triethylene glycol diacrylate and the composition was milled on a rubber mill for 30 minutes and then pressed into a 40-mil-thick sheet. An element was formed by laminating the sheet to an aluminum support following the procedure described in Example I. The clear, photopolymerizable element was exposed to air for 2 months. The composition remained clear with no white specks appearing in the layer.

A control element was prepared using 100 g. of cellulose acetate succinate, 50 g. of triethylene glycol diacrylate and 0.5 g. of anthraquinone. Within 4 hours, the surface became hazy and subsequently many white specks appeared in the photopolymerizable layer.

EXAMPLE III

To a 1-liter flask fitted with a reflux condenser was added 100 cc. of benzene, 2 g. of anthraquinone-2-carboxylic acid, 50 ml. of thionyl chloride and 1 ml. of pyridine. The flask was placed on a steam bath and the solution refluxed for 2 hours. The solvents and reagents were then removed by vacuum evaporation and the resulting anthraquinone carboxylic acid chloride recrystallized from benzene. Pure anthraquinone carboxylic acid chloride with a melting point of 148° C. was obtained.

To 50 g. of cellulose acetate succinate, 350 ml. of dioxane and 0.04 g. of pyridine, was added 0.08 g. of the anthraquinone carboxylic acid chloride described above. The solution was heated to 80° C., kept at this temperature for 2 hours and then added to 1200 ml. of cold distilled water. The high molecular weight anthraquinonyl polyester precipitated; it was washed in distilled water for 8 hours and dried at 45° C. for 2 days.

A two-gram portion of the dried polymer was mixed with 50 grams of triethylene glycol diacrylate and the mixture exposed to the collimated light of a 100-watt U.V. lamp at a distance of 10 inches. Polymerization was essentially complete after 80 seconds of exposure. A control sample of 50 grams of triethylene glycol diacrylate without any addition of photoinitiator was exposed under identical conditions. Polymerization did not occur in 210 seconds.

EXAMPLE IV

Two grams of cellulose acetate having a degree of acetyl substitution of 1.9 were dried over $P_2O_5$ under vacuum at 60° C. and dissolved in 60 ml. of dry and freshly distilled pyridine. 2-anthraquinone sulfonyl chloride (3.7 g.) prepared acording to Fierz-David, Helv. Chim. Acta. 10, 197–227 (1927), recrystallized from benzene in light yellow needles and having a melting point of 192–193° C., was added slowly at room temperature with stirring and allowed to stir for 24 hours. The reaction mixture warmed up to about 35° C. The next day the reaction mixture was poured into 100 ml. of acetone. A light yellow solid precipitated. After sedimentation of the solid, the supernatant liquid was decanted off and 50 ml. of cold alcohol was added to the solid. After a few minutes stirring and sedimentation, the product was obtained in the form of an off-white, fluffy solid. It was separated from the liquid and dried in air over night. The resulting polymeric compound, cellulose acetate 2 - anthraquinone sulfonate, melted with decomposition at 175–185° C.

A sample of triethylene glycol diacrylate containing 0.4% of the above polyester was exposed to ultraviolet radiation as in Example III. Polymerization occurred in 85 seconds exposure whereas a control containing no anthraquinone polyester did not polymerize in 210 seconds exposure.

EXAMPLE V

A 2.4 g. sample of cellulose acetate having a degree of acetyl substitution of 1.9 was dissolved in 35 ml. of hot acetonitrile that had previously been dried over anhydrous sodium sulfate. After cooling to room temperature, 0.70 ml. of trifluoroacetic anhydride and 0.126 g. of phenanthrenequinone-3-carboxylic acid were added. The mixture was heated in an oil bath at 100–105° C. and stirred at this temperature for three hours, then cooled to 20° C. and poured in an excess of sodium bicarbonate slurried with ice. The resulting yellow solid was freed of unreacted acid by washing in an electric high speed blender with several 100 ml. portions of a cold, saturated solution of sodium bicarbonate until the aqueous wash solution was colorless. Six to eight such washes were required. The resulting light yellow solid was then washed with cold distilled water until neutral and was dried. The dry weight was 1.5 g.

A mixture of 3 g. of pentaerythritol triacrylate and 0.015 g. of the above phenanthrenequinonyl ester was heated in a test tube on a steam bath until essentially all of the polymeric ester was dissolved. After cooling to room temperature, nitrogen was bubbled through the solution for 10 minutes and the mixture was exposed to the light from a 500-watt reflector type photoflood lamp at a distance of three inches. The test tube was cooled during exposure by an air stream. Extensive polymerization occurred after 15 seconds of exposure. A control sample of pentaerythritol triacrylate which did not contain a photoinitiator required an exposure of 75 seconds before polymerization occurred.

The polymeric polynuclear quinone initiators are also useful in photopolymerization elements and thermal transfer processes described in Belgian Patents 596,694, 594,909 and 593,834.

By calculation, it will be found that the antraquinone radical substitution of the polymeric anthraquinone compounds of Examples I, II, III, IV and V are, respectively, .0003, .007, .002, 1.1 and 0.05.

An advantage of this invention is that it provides practical processes for making new polymeric polynuclear quinones. Another advantage is that it provides polynuclear quinones having improved properties for use in photopolymerizable layers. The compounds have numerous uses and do not crystallize out of compositions with which they are incorporated. Instead, they are compatible with cellulose derivatives and other polymeric binding agents.

I claim:

1. A cellulose compound selected from the group consisting of cellulose, cellulose esters of fatty acids of 2–4 carbon atoms and cellulose alkyl and aryl ethers containing from 1–7 carbon atoms, having attached to the glucose units thereof a polynuclear quinone nucleus of the anthraquinone series, said nucleus having two intracyclic carbonyl radicals in a conjugated ring, there being at least one aromatic carbocyclic ring fused to said conjugated ring; said compound being characterized in that a carbon atom in a glucose unit is linked to a carbon atom of the anthraquinone nucleus through a linkage selected from a group consisting of carbonamide, sulfonamide, carboxylic acid ester and sulfonic acid ester linkages, there being an anthraquinone radical substitution per glucose unit of at least .0003.

2. An acetyl cellulose succinic acid amide of an aminoanthraquinone, there being an anthraquinone radical substitution per glucose unit of at least .0003.

3. A cellulose-fatty acid/anthraquinone carboxylic acid mixed ester wherein the fatty acid radical contains 2 to 4 carbon atoms, there being an anthraquinone radical substitution per glucose unit of at least .0003.

4. A cellulose-fatty acid/anthraquinone sulfonic acid mixed ester wherein said fatty acid radical contains 2 to 4 carbon atoms, there being an anthraquinone radical substitution per glucose unit of at least .0003.

5. A cellulose acetate/succinate/anthraquinone carboxylate, there being an anthraquinone radical substitution per glucose unit of at least .0003.

6. A cellulose acetate/2-anthraquinone sulfonate, there being an anthraquinone radical substitution per glucose unit of at least .0003.

7. A process which comprises reacting a polynuclear quinone containing an acid halide group with a cellulose compound selected from the group consisting of cellulose, cellulose esters of fatty acids of 2 to 4 carbon atoms and cellulose alkyl and aryl ethers containing from 1 to 7 carbon atoms and said cellulose compound containing at least one esterifiable hydroxyl group per glucose unit, and recovering a polymeric ester containing recurring polynuclear quinone radicals linked to the cellulose nucleus through an ester linkage.

8. A process according to claim 7 wherein said acid halide group is a carboxylic acid chloride group.

9. A process according to claim 7 wherein said acid halide group is a sulfonic acid chloride group.

References Cited by the Examiner

UNITED STATES PATENTS

| | | | |
|---|---|---|---|
| 2,923,673 | 2/1960 | Munger | 260—17 |
| 2,951,758 | 9/1960 | Notley | 96—35 |
| 3,012,952 | 12/1961 | Smith | 260—225 |
| 3,036,914 | 5/1962 | Jennings | 260—17 |
| 3,117,117 | 1/1964 | Berrie et al. | 8—1.246 |

LEON J. BERCOVITZ, *Primary Examiner.*

DONALD E. CZAJA, R. W. MULCAHY, H. WONG,
*Assistant Examiners.*